US005364554A

United States Patent [19]

Stanislowski et al.

[11] Patent Number: 5,364,554

[45] Date of Patent: * Nov. 15, 1994

[54] PROTEOLYTIC PERHYDROLYSIS SYSTEM AND METHOD OF USE FOR BLEACHING

[75] Inventors: Anna G. Stanislowski, Walnut Creek; Fred A. Heitfeld, Castro Valley; Richard J. Wiersema, Tracy; Ayyookaran J. Poulose, San Bruno, all of Calif.

[73] Assignee: The Clorox Company, Oakland, Calif.

[ * ] Notice: The portion of the term of this patent subsequent to Jul. 9, 2008 has been disclaimed.

[21] Appl. No.: 954,438

[22] Filed: Sep. 30, 1992

Related U.S. Application Data

[63] Continuation of Ser. No. 697,534, Apr. 30, 1991, abandoned, which is a continuation of Ser. No. 243,331, Sep. 12, 1988, abandoned, which is a continuation-in-part of Ser. No. 872,252, Jun. 9, 1986, abandoned.

[51] Int. Cl.$^5$ .......................... C09K 3/00; C01B 15/00; C11D 1/00

[52] U.S. Cl. .......................... 252/186.38; 252/186.41; 252/186.42; 252/186.43; 252/186.1; 252/174.12; 252/95

[58] Field of Search .......................... 252/186.38, 186.41, 252/186.42, 186.43, 186.44, 174.12, 95, 99

[56] References Cited

U.S. PATENT DOCUMENTS

| | | | |
|---|---|---|---|
| 3,553,139 | 1/1971 | McCarty | 252/95 |
| 3,558,498 | 1/1971 | Eymery et al. | 252/174.12 |
| 3,676,352 | 7/1972 | Grimm et al. | 252/174.12 |
| 3,840,466 | 10/1974 | Gray | 252/186.38 |
| 3,956,156 | 5/1976 | Osband et al. | 252/186.38 |
| 3,974,082 | 8/1976 | Weyn | 252/95 |
| 4,005,029 | 1/1977 | Jones | 252/99 |
| 4,283,301 | 11/1981 | Diehl | 252/102 |
| 4,316,812 | 2/1982 | Hancock et al. | 252/99 |
| 4,338,210 | 7/1982 | Clements et al. | 252/174.12 |
| 4,381,247 | 4/1983 | Nakagawa et al. | 252/95 |
| 4,412,934 | 11/1983 | Chung | 252/186.38 |
| 4,421,664 | 12/1983 | Anderson et al. | 252/94 |
| 4,421,668 | 12/1983 | Cox et al. | 252/174.12 |
| 4,462,922 | 7/1984 | Boskamp | 252/174.12 |
| 4,511,490 | 4/1985 | Stanislowski et al. | 252/174.12 |
| 4,585,150 | 4/1986 | Beacham et al. | 222/129 |
| 4,670,178 | 6/1987 | Huth et al. | 252/95 |
| 5,030,240 | 7/1991 | Wiersema et al. | 8/111 |
| 5,069,809 | 12/1991 | Lagerwaard et al. | 252/174.12 |
| 5,108,457 | 4/1992 | Poulose et al. | 8/111 |

FOREIGN PATENT DOCUMENTS

| | | | |
|---|---|---|---|
| 0185522 | of 0000 | European Pat. Off. . | |
| 130064 | 2/1968 | European Pat. Off. . | |
| 130756 | 3/1968 | European Pat. Off. . | |
| 166571 | 7/1970 | European Pat. Off. . | |
| 0310952 | 3/1976 | European Pat. Off. | 252/186.38 |
| 0359087 | 3/1990 | European Pat. Off. | C11D 3/386 |
| 3734047 | 1/1982 | Germany | 252/186.38 |
| 3806403 | 4/1982 | Germany | 252/186.38 |
| 864798 | 8/1970 | United Kingdom . | |
| 1356130 | 12/1974 | United Kingdom . | |
| 1401312 | 7/1975 | United Kingdom . | |

OTHER PUBLICATIONS

European Search Report.

Sheldon N. Lewis, "Peracid and Peroxide Oxidations", *Oxidation*, vol. 1, 213–254, Marcel Dekker, Inc. N.Y., N.Y. (1969).

Hagihara, "Bacterial and Mold Proteases", (1960).

Matsubara and Feder, "Other Bacterial Mold and Yeast Proteases", in: *Boyer, The Enzymes*, vol. III, pp. 721–795.

*Primary Examiner*—Robert L. Stoll
*Assistant Examiner*—Joseph D. Anthony
*Attorney, Agent, or Firm*—John A. Bucher

[57] ABSTRACT

A perhydrolysis system or activated oxidant system for in situ generation of peracid in aqueous solutions is disclosed including a protease enzyme, a source of hydrogen peroxide and an ester substrate having the general structure

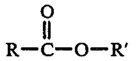

where R and R′ are alkyl groups unsubstituted or substituted with at least one functional group. Preferred substrates are defined which are preferably chemically non-perhydrolyzable. Processes for bleaching and peracid production are also disclosed.

4 Claims, No Drawings

PROTEOLYTIC PERHYDROLYSIS SYSTEM AND METHOD OF USE FOR BLEACHING

This is a continuation of Ser. No. 07/697,534, filed Apr. 30, 1991, now abandoned, itself a continuation of Ser. No. 07/243,331, filed Sep. 12, 1988, now abandoned and which is also a continuation-in-part of U.S. patent application Ser. No. 06/872,252, filed Jun. 9, 1986, now abandoned with at least one inventor in common with the present invention, entitled ENZYMATIC PERHYDROLYSIS SYSTEM AND METHOD OF USE FOR BLEACHING and assigned to the assignee of the present invention (hereinafter referred to as the "parent"). The parent was succeeded by Ser. No. 07/363,442, filed Jun. 6, 1989, now abandoned, itself succeeded by Ser. No. 768,446, filed Sep. 30, 1991, now abandoned, and finally by Ser. No. 07/964,565, filed Oct. 21, 1992, now U.S. Pat. No. 5,296,161. Accordingly, the parent noted above is incorporated by reference as though set forth in its entirety herein because of the relationship between the inventions and to assure a complete understanding of the present invention.

FIELD OF THE INVENTION

The present invention relates to a novel proteolytic perhydrolysis or activated oxidant system and method of use for the system in an aqueous solution for achieving enhanced bleaching, the activated oxidant system and bleaching method being particularly characterized by the ability to produce peracid in the aqueous solution.

BACKGROUND OF THE INVENTION

Various bleaches have long been employed in numerous cleaning applications including the washing and prewashing of fabrics as well as in other applications such as hard surface cleaning. In these applications, the bleaching agent oxidizes various stains or soils on fabrics, textiles and hard surfaces.

Peroxygen bleaching compounds such as hydrogen peroxide, sodium percarbonate and sodium perborate have been found useful in dry bleach formulations because of their oxidizing power.

It has also been found that certain organic compounds, including activators such as tetraacetylethylenediamine, can be added to perborate bleaches for improved bleaching performance because of in situ formation of peracetic acid.

Cleaning compositions for fabrics, textiles and other materials including hard surfaces have also been developed which employ various enzymes for removing certain stains or soils. Protease enzymes have been found useful for hydrolyzing protein-based stains particularly in the cleaning of fabrics. Amylase enzymes have been found useful against carbohydrate-based stains resulting, for example, from foods. Lipase enzymes have also been found useful for hydrolyzing fat-based stains in a prewash or presoak mode.

In connection with the use of enzymes in cleaning or detergent compositions, European Patent Application, Publication, No. 0 130 064, (1985), applied for by Novo Industry A/S, related to improvements in enzymatic additives for use with detergents in washing applications. That publication discussed the use of lipase enzymes for achieving substantially improved lipolytic cleaning efficiency, over a broad range of wash temperatures including relatively low temperatures below 60° C. This reference further disclosed the use of enzymes, including lipases, for direct interaction with stains or soils as a means of at least partially dissolving or loosening such fat-based stains.

U.S. Pat. No. 3,974,082, issued Aug. 10, 1976 to Weyn, disclosed a bleaching composition and method of use in which an acyl-alkyl ester was used with an esterase or lipase enzyme in an aqueous medium. However, nothing in the prior art disclosed or taught that proteases can be used in combination with a source of hydrogen peroxide and selected ester substrates to produce peracid in an aqueous medium. In any event, there has been found to remain a need for improved bleaching or activated oxidant systems capable of enhanced performance in aqueous solution under high or low temperature wash conditions.

SUMMARY OF THE INVENTION

The present invention provides a successful activated oxidant system, as well as associated methods of peracid production and bleaching by enzymatic perhydrolysis of an ester substrate in the presence of a source of hydrogen peroxide and a proteolytic enzyme in order to produce a peracid.

The incorporated parent, noted above, disclosed and claimed the use of enzymes having lipase and/or esterase activity in an activated oxidant system together with a source of hydrogen peroxide and a functionalized ester substrate having the structure

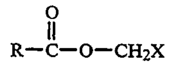

where R is a substituent having at least one carbon atom, more preferably where R is a straight chain or branched chain alkyl optionally substituted with one or more functional groups or heteroatoms, and X is a functional moiety so that the substrate is capable of hydrolysis by an enzyme of the type noted immediately above. More specifically, the incorporated parent reference contemplated the use of enzymes having lipase activity together with generally insoluble substrates, preferably in combination with surfactants or emulsifers for promoting interaction of the enzyme and substrate at a phase interface. The invention in the incorporated parent was further based on the understanding that numerous enzymes can exhibit lipase and/or esterase activity and thus be capable of functioning is more than one mode.

The brief preceding summary of the invention from the incorporated parent is set forth above in order to permit a better understanding of the present invention as summarized below. A more detailed description of the invention in the incorporated parent is not believed necessary since it has been incorporated by reference herein.

Protease enzymes are also capable of hydrolyzing ester substrates. However, when this reaction takes place in the presence of hydrogen peroxide, perhydrolysis surprisingly results to produce a peracid which is particularly useful, for example, in bleaching applications. The ester substrates of the present invention are preferably chemically non-perhydrolyzable.

Thus, it is a particular object of the present invention to provide an activated oxidant system for in situ generation of peracid, the system comprising:

(a) a protease enzyme;

(b) an ester substrate having the structure:

$$R-\overset{O}{\overset{\|}{C}}-O-R'$$

where R and R' are respectively either an unsubstituted alkyl group or an alkyl group substituted with a functional group, the substrate being capable of perhydrolysis by the protease enzyme of (a); and a source of peroxygen capable of reacting with with the protease enzyme of (a) and the ester substrate of (b) to result in proteolytic production of peracid.

Preferably, in the above substrate structure, —O—R' is chemically non-perhydrolyzable so that the protease enzyme can be employed with relatively inexpensive substrates. This is particularly advantageous in combination with the relatively inexpensive protease enzymes of the invention.

It is a further related object of the invention to provide a method of bleaching and a method of forming peracid employing the activated oxidant system summarized above.

It is an even more specific object of the invention to provide such an activated oxidant system wherein R includes an alkyl group unsubstituted or substituted with a component selected from the class consisting of ethoxylated groups, propoxylated groups, sulfonate, nitro-, halogen and sulfate and R' includes a chemically non-perhydrolyzable alkyl group unsubstituted or substituted with a component selected from the class consisting of hydroxyl groups, ethoxylated groups, propoxylated groups, sulfonate, nitro-, halogen and sulfate.

Even more preferably, within the structure summarized above, the substrate may further have the structure:

$$R'-Z-\overset{O}{\overset{\|}{C}}-O-(CH_2)_n-X$$

where $R'=C_{1-10}$ alkyl; Z=0, $(CH_2CH_2O)_m$—, $$\underset{\displaystyle CH_3}{(\overset{}{CH}-CH_2O)_m}-,$$

NH, $SO_2$ or NR" (wherein m=0-10 and R"=phenyl or $C_{1-4}$ alkyl); n=0-10; X=OH, —OR" or —NR"$_2$; and X may be pendent on or terminate the hydrocarbyl chain.

Additional objects and advantages of the invention are made apparent in the following description and examples of the invention, which, however, are not to be taken as limiting the scope of the invention but rather to facilitate an understanding thereof.

DESCRIPTION OF THE PREFERRED EMBODIMENTS

As noted above, the present invention relates to a novel peracid generating reaction in the form of an proteolytic perhydrolysis system and corresponding process of bleaching, in aqueous solution, providing relatively high bleaching activity with or without enhanced detergency in both high and low temperature wash applications.

The novel proteolytic perhydrolysis system essentially comprises a protease enzyme having esterase activity as defined below, an ester substrate and a source of hydrogen peroxide. Accordingly, the invention is based upon peracid or perhydrolysis chemistry which, by itself, has been dealt with at length in the prior art, for example, in an article by Sheldon N. Lewis, entitled "Peracid and Peroxide Oxidations" in the publication *Oxidation*, Volume 1, published by Marcel Dekker, Inc., New York, N.Y., 1969, (see pages 213-254). Although such a detailed discussion of basic peracid and perhydrolysis chemistry is not believed necessary for an understanding of the invention by those skilled in the art, that reference is incorporated herein as though set out in its entirety to assist in understanding of the invention.

In addition to the essential components of the perhydrolysis system including a protease enzyme having esterase activity, an ester substrate an a hydrogen peroxide source, the perhydrolysis system may also include buffering agents, emulsifying agents, stabilizers and other adjuncts described in greater detail below.

Typical peracid precursors are known which are converted to peracid non-enzymatically. Typical peracid precursors require specific chemical modification (Published Specification GB 864,798 published Apr. 6, 1961; U.S. Pat. No. 4,412,934 issued Nov. 1, 1983 to Chung et al; U.S. Pat. No. 4,283,301 issued Aug. 11, 1981 to Diehl; and Published Application EP 166571 published Jan. 2, 19860 to be of sufficient reactivity to provide the requisite performance attributes.

In order to ensure proper understanding and interpretation of the invention, a number of definitions are set forth below to clarify the use of terms employed herein. The defined terms include the following:

"Perhydrolysis", as applied to the present invention, is defined as the reaction of an ester substrate with hydrogen peroxide to generate a peracid. As discussed elsewhere, the hydrogen peroxide may be supplied from a variety of sources.

In the perhydrolysis reactions discussed herein, both the inorganic peroxide starting material and the peracid product are oxidants. Traditionally, inorganic peroxide has been used as an oxidant, for example, in dry laundry bleaches. However, the oxidative power of the inorganic peroxide and peracid product are very different, and it is important to note that the peracid product is the desired oxidant for laundry bleaches according to the present invention. The oxidative ability of the peracid product makes it an effective stain removal agent for laundry bleaches. Simultaneously, the peracid oxidant remains sufficiently mild to assure only minimal reaction with fabric dyes.

Therefore, it is very important to distinguish these two oxidants from each other and to correctly identify the source of measured active oxygen. The source of measured active oxygen in the present invention may be determined by a modification of the thiosulfate assay technique which is well known to those skilled in the art.

"Chemical perhydrolysis" generally includes those perhydrolysis reactions in which an activator or peracid precursor such as tetraacetylethylenediamine is combined with a source of hydrogen peroxide. Accordingly, sufficient reactivity between the peracid precursor or activator and inorganic peroxide must be present to produce the perhydrolysis reaction.

"Enzymatic perhydrolysis" is defined as a perhydrolysis reaction which is assisted or catalyzed by an enzyme generally classified as a hydrolase and more specifically identified below.

"Proteolytic perhydrolysis" is similarly defined as enzymatic perhydrolysis but with the enzyme specifically being a protease.

"Chemically non-perhydrolyzable" substrates are those which do not undergo substantial chemical perhydrolysis when combined with a source of hydrogen peroxide in an aqueous medium. Thus, "chemically non-perhydrolyzable" substrates do not significantly activate hydrogen peroxygen and produce peracid. Many "simple" esters, such as ethyl acetate, are only poorly chemically perhydrolyzed, compared to complex esters such as acetoxybenzene sulfate ("AOBS"); but the simple esters are either naturally derived or else easily synthesized, making them quite inexpensive, in contrast to the peracid precursors noted above.

Thus, necessary components for enzymatic or proteolytic perhydrolysis include a substrate, a source of inorganic peroxide and an enzyme. The components may also include other adjuncts which are generally outside the scope of this invention although they may be of importance in a commercial product or process employing the invention.

Substrates of the type particularly contemplated by the present invention, as summarized above, are described in further detail below.

Inorganic peroxide is traditionally provided by perborate or percarbonate salts.

Characteristics and preferred examples of the three essential components of the proteolytic perhydrolysis system, including the ester substrate, the protease enzyme and the peroxide source are discussed in greater detail below, followed by a brief discussion of other adjuncts which can be used together with the perhydrolysis system and a number of examples embodying the enzymatic perhydrolysis system of the invention.

Ester Substrate

As noted above, the substrate of the activated oxidant system is selected for enzyme catalyzed reaction, in the presence of a source of hydrogen peroxide, to form peracid.

As will be discussed in greater detail below, certain substrates are normally present as solids and particularly lend themselves to use in dry formulations including the substrate, enzyme and peroxide source. In such products, it is important that the dry formulation exhibit prolonged shelf life with the enzyme catalyzed reaction not taking place until the formulation is added to an aqueous solution.

For use in a laundry detergent formulation, for example, the substrate may also exhibit surface active characteristics so that in situ formation of the peracid occurs at or near the surface of the fabric to be cleaned. This assures greater effectiveness of the oxidant responsible for bleaching action.

It has been found, in accordance with the present invention and as summarized above, that various esters are particularly suitable as the substrate for the present proteolytic perhydrolysis system.

In general terms, the ester substrate of the present invention is preferably selected without functional groups or only with those functional groups which do not tend to decompose the resulting peracid produced in the process of the invention. This definition accounts for the identity of the substituents in the ester structures as defined above to include generally those functional groups which do not react appreciably with peracid in aqueous solution and over a time period and temperature range corresponding to a typical wash cycle, for example, about twelve to fifteen minutes and 20°-40° C.

However, it is further to be noted that the preceding definition and the substituents listed for the structures summarized above are not exhaustive of ester substrates which can be employed in the present invention. For example, it is particularly noted that protease enzymes are frequently described in reactions with esters having substituted alpha amine groups. Since the alpha amine groups of such conventional substrates for protease enzymes are susceptible to reaction with peracid, they are not included in the preferred substrates listed above.

However, in a broader sense, the selection of suitable ester substrates for use within the present invention does not exclude such substrates simply because they include functional groups which are reactive with peracids. Rather, in some instances, it may result that a particular functional group will exhibit diverse characteristics of (a) promoting peracid formation on the one hand and (b) then reaction with and rendering ineffective the resulting peracid after it has been formed in the aqueous solution. In such a situation, actual selection of the ester substrate may depend upon the relative effectiveness of the functional groups in each of the above instances and the resulting overall effect on available peracid resulting in the wash solution. In other words, even substrates containing reactive functional groups such as substituted alpha amines may be employed to advantage within the invention if they are of greater value in enhancing peracid production compared to their tendency to react with and poison the resulting peracid.

The preceding characteristics for substituted alpha amine groups are believe to apply whether the amines are present in primary or secondary form. In addition, the preceding characteristics discussed in connection with ester substrates having substituted alpha amine groups may apply, for similar reasons, to ester substrates with other functional groups such as mercaptans and disulfide groups, for example. In any event, it is again noted that the final characteristic in determining desirability of an ester substrate for use in the present invention is whether it has an overall affect in either enhancing or diminishing the amount of peracid resulting during a typical wash cycle.

Particular substrates contemplated by the present invention thus include but are not limited to methyl acetate; (2-hexyloxyethoxy) acetic acid, (2-hydroxypropyl) ester; methylmethoxyacetate; octanoic acid, (2-hydroxypropyl) ester; methyloctanoate and ethyloctanoate.

All of the substrates discussed above are inexpensive and are thus also important for reducing initial cost of the enzymatic perhydrolysis system of the present invention. The substrate and hydrogen peroxide source are the two major components of the enzymatic perhydrolysis system on a weight basis. The enzyme need only be present in very small amounts, less than stoichiometric, to carry out the in situ peracid production contemplated in the aqueous solution. The enzyme thus acts in a catalytic manner in that, while it participates in the reaction, it is not consumed but regenerates itself for further reaction.

Peroxide Source

As for the oxidant source of the enzymatic perhydrolysis system of the invention, virtually any source of peroxide is satisfactory. For example, the peroxide source may comprise a perborate or percarbonate such as sodium perborate or sodium percarbonate. In addition, the peroxide source may comprise or include hydrogen peroxide adducts such as urea hydrogen peroxide, liquid hydrogen peroxide, etc.

Further discussion of the particular oxidant source is not believed necessary except to the extent that the source is selected to produce hydrogen peroxide also in accordance with the preceding discussion.

Enzyme

Since the substrate of the proteolytic perhydrolysis system is characterized by an ester structure, suitable enzymes for use in the enzymatic perhydrolysis system necessarily require esterase activity.

General characteristics of protease enzymes of the types noted above are well known in the prior art and are readily available from a number of commercial sources. Protease enzymes have long been known to be widely distributed in many tissues, fluids, cells, seeds, organs etc. and to perform an important metabolic function, classically for cleaving amide bonds in proteins.

In accordance with the preceding requirements for the protease enzyme, the enzyme for use within the present invention may be selected from a broad class of known protease enzymes. A number of references are illustrative of a range of such protease enzymes which may be employed in the present invention. Such references include, for example, U.S. Pat. No. 4,511,490 issued Apr. 16, 1985 to Stanislowski, et al and assigned to the assignee of the present invention; Hagihara, "Bacterial and Mold Proteases," (1960); and Matsubara and Feder, "Other Bacterial, Mold and Yeast Proteases," in *Boyer, The Enzymes* Volume III, pages 721–795.

Proteases which have been modified to be more oxidation stable, for example, those according to the protocol set forth in EP 130 756, published Sep. 1, 1985, and incorporated herein by reference, may also be suitable for use.

The above references are particularly of value in disclosing many examples of protease enzymes suitable for the present invention while more particularly disclosing certain protease enzymes known to be useful in the prior art in cleaning or bleach formulations. Here again, it is noted that the present invention is not limited to such protease enzymes known to be useful in such cleaning or bleach applications.

Furthermore, the preceding references are also specifically helpful in defining certain protease enzymes according to the classifications of alkaline, neutral and acidic enzymes. Generally, the classifications refer to enzymes which are particularly active in either alkaline, neutral or acidic pH conditions. Since the perhydrolysis system of the present invention may be employed in formulations with widely varying pH ranges, all of the above three types of protease enzymes are contemplated for use within the present invention. However, since many conventional cleanser or bleach compositions are typically alkaline or neutral, the present invention particularly contemplates the use of either alkaline or neutral protease enzymes because of their increased activity in such conventional systems.

In any event, the preceding references are incorporated herein by reference as though set forth in their entirety to assure a more complete understanding and disclosure of the present invention.

Enzyme stability is also important with respect to temperature, peroxides, peracids and other possibly harmful agents or factors which may be present in cleanser formulations employing the enzyme perhydrolysis system.

Although any of the protease enzymes disclosed in the above references may be employed in the present invention, certain protease enzymes are disclosed in the following examples and are further identified below in terms of activity and specific activity definitions in Table I.

TABLE I

| Enzymes From The Following Examples | | |
|---|---|---|
| Enzyme | Activity | Activity Definition |
| Esperase ® | 3.83 KNPU/ per gram of material | One Novo-proteinase unit is defined as that amount of enzyme which, under standard conditions, hydrolyzes casein at such a rate that the initial rate of formation of peptides giving a color with trinitrobenzenesulfonate (TNBS) corresponds to 1 micromole of glycine/minute. Standard conditions are 0.5% Hammarsten casein (Merck) in 0.05 M borate buffer at pH 9.0 (measured a 20° C.) reacting for 20 minutes at 50° C. |
| Alcalase ® | 1.48 Anson Units per gram of material | One Anson unit is the amount of enzyme which under standard conditions digests hemoglobin at an initial rate liberating per minute an amount of trichloroacetic acid (TCA) soluble product which gives the same color with phenol reagent as one milliequivalent of tyrosine. Denatured hemoglobin is used as substrate at pH 7.5, 25° C., in a 10 minute reaction. |
| Carboxy-peptidase A | 892.9 U/ml | 1 unit (U) will hydrolyze 1 micromole/min of hippuryl-L-phenylalanine at pH 7.5, 25° C. |
| Alpha-Chymotrypsin | 46 U/mg solid | 1 unit (U) will hydrolyze 1 micromole/min of N-benzoyl-L-tyrosine ethyl ester at pH 7.8, 25° C. |

The first two enzymes above are from Novo Industries and the latter two are available from Sigma Chemical Company with their activities in units per milliliters (U/ml) values being calculated from the total number of units purchased as reported from the supplier divided by the volume of the supplied sample.

The Enzymatic Perhydrolysis Reaction

The present invention is based on the interaction of a protease enzyme with an ester substrate, because of the esterase activity exhibited by the protease enzyme. Proteolytic perhydrolysis occurs, according to the invention, where the protease enzyme and ester substrate interact with each other in the presence of a source of hydrogen peroxide. This interaction is discussed above and also dealt with at length in the prior art, including the references noted above.

It has surprisingly been found that protease enzymes added to a soluble ester substrate and combined with hydrogen peroxide produce peracid. This is surprising because (1) the protease enzymes exhibit an ability to produce peracid in a hostile, oxidizing environment (both peroxide and peracid are present in the active site) and (2) peroxide is not a natural reactant; here, it replaces or competes with water to participate in the hydrolase-catalyzed reaction of an ester substrate to generate peracid.

It is particularly important to understand that the hostile environment referred to above is different from the environment encountered by the prior art use of protease enzymes in detergent products. The hostile environment of the present invention is unusual in that the protease of the invention is employed to actually produce the peracid. In contrast to earlier systems containing peroxide, the peracid is a more active oxidant. In the present invention, it is produced directly in the active site of the enzyme, a particularly critical location relative to enzyme activity. Thus, in the present invention, the protease enzyme produces a material—the peracid—which is considered damaging to the enzyme.

It is also important to understand, in terms of the present invention, that the protease enzyme is not absolutely stable. Rather, it is important to consider whether the protease enzyme will survive long enough to promote peracid generation during a normal wash cycle as discussed above. It is also important to understand that the enzyme reacts catalytically. Thus, it must survive many instances of intimate contact with peracid as described above in order to provide the unexpected benefit of the invention.

The reaction of the perhydrolysis system of the invention exhibits a number of important practical advantages in generating peracid for bleach applications. These advantages include the following:

(1) The preferred substrates are widely available and relatively inexpensive compared to "activators" as discussed above;

(2) The protease enzyme is relatively expensive (compared to other bleach constituents) but is used in very small amounts because if functions in enzymatic or catalytic fashion and need not be present in stoichiometric quantities; and (3) In contrast to the lipase enzymes of the parent, the invention does not depend on perhydrolysis occurring only at phase interfaces. The enzymes of the present invention are very reactive, especially with soluble substrates in contrast to the lipase enzymes of the parent, for example. However, as was also noted above, the present invention is not limited to the use of such soluble substrates.

Various other advantages are also present within the perhydrolysis system of the invention. For example, the reaction described above can take place at a variety of pH levels as demonstrated further in the following examples. Thus, the enzymatic perhydrolysis system is useful in normally basic aqueous solutions and also in relatively neutral solutions and even in acidic solutions. In this regard, there has been found to be real utility for peracid precursor systems capable of functioning at a variety of pH levels inherent in different cleaning applications, even for hard surfaces and particularly for different laundry applications.

As was noted above, any protease enzymes included within the broad classes of alkaline, neutral and acidic types may be employed within the present invention. However, as was noted above, alkaline and neutral type enzymes may be considered preferable because of the prevalence for bleaching and cleaning products to be relatively alkaline or neutral in pH. Even more preferably, in accordance with the examples set forth below, preferred protease enzymes, according to the present invention, include Alcalase®, Esperase®, carboxypeptidase A and alpha-chymoptrypsin.

As a further example, some newer detergents or cleaners operate at lower pH levels than previously. Thus, with the proteolytic perhydrolysis system of the present invention, the use of a buffer is possible but not necessary and any pH is possible between a relatively basic pH of 10.5 to a lower pH level of about 8.0.

As also noted above, the enzymatic perhydrolysis system of the present invention is also adapted for use at a wide variety of temperatures, as long as the temperatures do not denature the enzyme. Accordingly, the proteolytic perhydrolysis system of the invention may be employed in low temperature wash conditions as well as high temperature wash conditions.

In any event, the enzymatic perhydrolysis system of the present invention has particularly been found useful in low temperature wash cycles where it has traditionally been more difficult to achieve effective bleaching.

Other Adjuncts

The use of emulsifiers or surfactants is generally desirable as in other peracid bleach products, for example, to promote detergency and other characteristics desirable in such products. In addition, the emulsifying agents may or may not enhance proteolytic perhydrolysis. Accordingly, they are not considered essential to this invention.

Within the above guidelines, nonionic surfactants are believed particularly suitable for use within the enzyme perhydrolysis system of the invention. Nonionic surfactants include linear ethoxylated alcohols, such as those sold by Shell Chemical Company under the brand name NEODOL. Other nonionic surfactants include various linear ethoxylated alcohols with an average length of from about 6 to 16 carbon atoms and averaging about 2 to 20 moles of ethylene oxide per mole of alcohol; linear and branched, primary and secondary ethoxylated, propoxylated alcohols with an average length of about 6 to 16 carbon atoms and averaging 0 to 10 moles of ethylene oxide and about 1 to 10 moles of propylene oxide per mole of alcohol; linear and branched alkylphenoxy (polyethoxy) alcohols, otherwise known as ethoxylated alkylphenols with an average chain length of 8 to 16 carbon atoms and averaging 1.5 to 30 moles of ethylene oxide per mole of alcohol; and mixtures thereof.

Additional nonionic surfactants include certain block copolymers of propylene oxide and ethylene oxide, block polymers propylene oxide and ethylene oxide with propoxylated ethylene diamine, and semi-polar nonionic surfactants such as amine oxides, phosphine oxides, sulfoxides, and their ethoxylated derivatives.

Anionic surfactants may also be employed. Examples of such anionic surfactants include alkali metal and alkaline earth metal salts of $C_6$–$C_{18}$ fatty acids and resin acids, linear and branched alkyl benzene sulfonates, alkyl sulfates, alkyl ether sulfates, alkane sulfonates, olefin sulfonates and hydroxyalkane sulfonates.

Suitable cationic surfactants include the quarternary ammonium compounds in which typically one of the groups linked to the nitrogen atom is a $C_8$–$C_{18}$ alkyl group and the other three groups are short chained alkyl groups which may bear inert substituents such as phenyl groups.

Further, suitable amphoteric and zwitterionic surfactants, which may contain an anionic water-solubilizing group, a cationic group and a hydrophobic organic group, include amino carboxylic acids and their salts, amino dicarboxylic acids and their salts, alkylbetaines, alkyl aminopropylbetains, sulfobetaines, alkyl imidazolinium derivatives, certain quarternary ammonium compounds, certain quarternary ammonium compounds and certain tertiary sulfonium compounds. Other examples of potentially suitable zwitterionic surfactants can be found in Jones, U.S. Pat. No. 4,005,029, as columns 11-15, which is also incorporated herein by reference.

Other exemplary emulsifiers include water soluble or dispersible polymers, such as polyvinyl alcohol (PVA), polyvinylpyrrolidone (PVP), methylhydroxypropylcellulose (MHPC), etc. as well as bile and other natural emulsifiers.

Additional adjuncts of a wide variety may be considered for use in combination with the enzymatic perhydrolysis system of the prevent invention, depending upon the specific application contemplated. For example, as noted above, the enzymatic perhydrolysis system may be employed or included within a wide variety of cleaning applications or formulations such as straight bleach products, prewash products (which are often in liquid form) and even various hard surface cleansers.

For liquid formulations, it may be convenient to keep the hydrogen peroxide source separate from either the substrate or the enzyme, and preferably, from both. This may be accomplished by using a multiple chambered dispenser, such as that disclosed in U.S. Pat. No. 4,585,150, issued Apr. 29, 1986, to Beacham et al, and commonly assigned to The Clorox Company.

Another potential mode of delivering the inventive proteolytic perhydrolysis system is in a substantially nonaqueous liquid detergent as described in U.S. Pat. No. 4,316,812, issued Feb. 23, 1982, to Hancock et al, the text of which is incorporated herein by reference.

Additional adjuncts may include fragrances, dyes, builders, stabilizers, buffers, etc. Stabilizers may be included to achieve a number of purposes. For example, the stabilizers may be directed toward establishing and maintaining effectiveness of the enzymes for original formulation components or even intermediate products existing after the formulation is placed in an aqueous solution. Since enzymes may be hindered in hydrolysis of the substrates because of heavy metals, organic compounds, etc., for example, suitable stabilizers which are generally known in the prior art may be employed to counter such effects and achieve maximum effectiveness of the enzymes within the formulations.

Buffering agents can also be utilized in the invention to maintain a desired alkaline pH level for the aqueous solutions. Buffering agents generally include all such materials which are well known to those skilled in the detergent art. In particular, buffering agents contemplated for use in the present invention include but are not limited to carbonates, phosphates, silicates, borates and hydroxides.

Experimental Data

It is generally believed that the preceding discussion fully sets forth the novel combination of the enzymatic perhydrolysis system of the present invention. However, in order to assure a complete understanding of the invention, a number of specific examples embodying the proteolytic perhydrolysis system of the invention are set forth in the following examples.

The following examples are set forth in tables below to better define the invention.

In Table II immediately below, various enzymes were employed in combination with a methylacetate substrate to demonstrate perhydrolysis in an aqueous solution at a pH level of 10.5. One of the enzymes was also tested with the methylacetate substrate at a pH of 8.5 but did not result in perhydrolysis. The perhydrolysis examples of Table II were run an aqueous solution on a pH stat (30 ml sample size) with 400 ppm A.O. hydrogen peroxide. The methylacetate substrate employed in the examples of Table II has a structure as illustrated below:

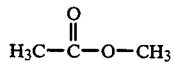

TABLE II

| Example | Enzyme | Total Enzyme Activity | pH | Perhydrolysis, ppm peracid A.O. (S.D.)* |
|---|---|---|---|---|
| 1. | — | — | 10.5 | N.S.** |
| 2. | Esperase ® | 11.5 U | 10.5 | 0.92 (0.03) |
| 3. | Alcalase ® | 4.4 mU | 10.5 | 0.93 (0.06) |
| 4. | Alpha-Chymotrypsin | 138 U | 10.5 | 0.83 (0.02) |
| 5. | Alpha-Chymotrypsin | 276 U | 10.5 | 0.72 (0.04) |
| 6. | Carboxy-peptidase A | 2.7 U | 10.5 | 0.92 (0.10) |
| 7. | Carboxy-peptidase A | 2.7 U | 8.5 | 0 (0) |

*Standard deviation. Standard deviation(s) is defined by the following formula:

$$s = \sqrt{\frac{\Sigma (X - \bar{X})^2}{n - 1}}$$

where the term $\Sigma (X - \bar{X})^2$ is the sum of the squares of the deviations from the mean and "n" is the sample size.

**Not significant (relative to error as measured by S.D. or standard deviation).

Table III set forth below demonstrates similar results for generally the same enzymes employed with methylmethoxyacetate as a substrate. Here again, all of the reactions were run in an aqueous solution on the pH stat (30 ml sample size) at a constant pH of 10.5 with 400 ppm A.O. (hydrogen peroxide). Multiple concentrations of the enzymes of Table III are set forth because of the different resulting levels of perhydrolysis.

The methylmethoxyacetate substrate of Table III has a structure as indicated immediately below:

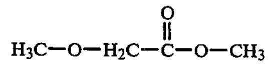

TABLE III

| Example | Enzyme | Total Enzyme Activity | pH | Perhydrolysis, ppm peracid A.O. (S.D.) |
|---|---|---|---|---|
| 8. | — | — | | N.S. |
| 9. | Esperase ® | 11.5 U | | 1.5(0.1) |
| 10. | Alcalase ® | 4.4 mU | | 1.6(0.0) |
| 11. | Alcalase ® | 2.2 mU | | 1.6(0.2) |
| 12. | Alcalase ® | 1.1 mU | | 1.6(0.0) |
| 13. | Alcalase ® | 0.6 mU | | 1.3(0.1) |
| 14. | Alpha-Chymotryspin | 138 U | | 1.5(0.0) |
| 15. | Alpha-Chymotryspin | 69 U | | 1.7(0.0) |
| 16. | Alpha-Chymotryspin | 35 U | | 1.7(0.0) |
| 17. | Alpha-Chymotryspin | 17 U | | 1.7(0.0) |
| 18. | Carboxy-peptidase | 22 U | | 1.3(0.0) |
| 19. | Carboxy-peptidase | 9 U | | 1.4(0.0) |
| 20. | Carboxy-peptidase | 22 U | | 1.5(0.1) |

TABLE III-continued

| Example | Enzyme | Total Enzyme Activity | pH | Perhydrolysis, ppm peracid A.O. (S.D.) |
|---|---|---|---|---|
| | (+0.5 M NaCl) | | | |
| 21. | Carboxy-peptidase (+0.5 M NaCl) | 9 U | | 1.0(0.1) |

In the following examples of Table IV, perhydrolysis was carried out again with a number of enzymes and (2-hexyloxyethoxy) acetic acid, (2-hydroxypropyl) ester (6.25 mM, 0.188 meq). The perhydrolysis reactions in Table III were carried out in an aqueous solution on the pH stat (30 ml sample size) at a constant pH of 10.5 again with 400 ppm A.O. (hydrogen peroxide). Here again, multiple concentrations of certain enzymes are illustrated since they demonstrate varying levels of perhydrolysis.

The (2-hexyloxyethoxy) acetic acid, (2-hydroxypropyl) ester substrate in the examples of Table IV has a structure as illustrated immediately in below:

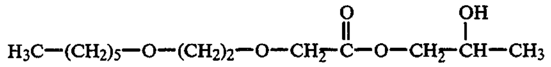

TABLE IV

| Example | Enzyme | Total Enzyme Activity | pH | Perhydrolysis, ppm peracid A.O. (S.D.) |
|---|---|---|---|---|
| 22. | — | — | | 3.3(0.6) |
| 23. | Esperase ® | 11.5 U | | 3.5(0.1) |
| 24. | Alcalase ® | 4.4 mU | | 3.9(0.0) |
| 25. | Alcalase ® | 0.4 mU | | 4.1(0.1) |
| 26. | Alpha-Chymotryspin | 138 U | | 3.7(0.0) |
| 27. | Alpha-Chymotrypsin | 14 U | | 4.0(0.0) |
| 28. | Carboxy-peptidase A | 89 U | | 4.1(0.0) |

Further perhydrolysis reactions were carried out with 2-hydroxypropyloctanoate as a substrate. Here again, the perhydrolysis reactions were run in an aqueous solution on the pH state (30 ml sample size) at a constant pH level of 10.5 with 400 ppm A.O. (hydrogen peroxide). Multiple concentrations of the enzymes are also illustrated in the examples of Table V to demonstrate the different resulting levels of perhydrolysis.

The 2-hydroxypropyloctanoate substrate of Table V has a structure illustrated immediately below:

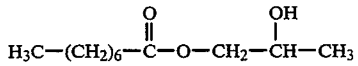

TABLE V

| Example | Enzyme | Total Enzyme Activity | pH | Perhydrolysis, ppm peracid A.O. (S.D.) |
|---|---|---|---|---|
| 29. | — | — | | 0.44(0.10) |
| 30. | Esperase ® | 11.5 U | | 0.51(0.01) |
| 31. | Esperase ® | 1.15 U | | 0.57(0.02) |
| 32. | Alcalase ® | 4.4 mU | | 0.56(0.01) |
| 33. | Alcalase ® | 0.4 mU | | 0.42(0.01) |
| 34. | Alpha-Chymotryspin | 138 U | | 0.85(0.02) |
| 35. | Alpha-Chymotrypsin | 14 U | | 0.59(0.02) |

TABLE V-continued

| Example | Enzyme | Total Enzyme Activity | pH | Perhydrolysis, ppm peracid A.O. (S.D.) |
|---|---|---|---|---|
| 36. | Carboxy-peptides A | 18 U | | 0.54(0.01) |

In each of the preceding tables, the first example is a blank sample without enzyme to demonstrate perhydrolysis for the respective substrate in the present of hydrogen peroxide at the conditions shown. Generally, the examples in Tables II–V illustrate varying degrees of perhydrolysis according to the present invention.

The foregoing description, embodiments and examples of the invention have been set forth for purposes of illustration and not for the purpose of restricting the scope of the invention. Other non-limiting embodiments of the invention are possible in addition to those set forth above in the description and in the examples. Accordingly, the scope of the present invention is defined only by the following claims which are also further illustrative of the present invention.

What is claimed is:

1. A method of improving the in situ production of peracid by proteolytic perhydrolysis from an aqueous medium containing a combination of an effective amount of a source of hydrogen peroxide and a substrate having the structure:

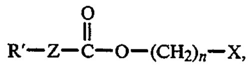

wherein $R'=C_{1-10}$ alkyl; Z=0, $(CH_2CH_2O)_m$—,

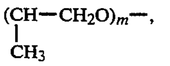

NH, $SO_2$ or NR″ (wherein m=0–10 and R″=phenyl or $C_{1-4}$ alkyl); n=0–10; X=H, OH, —OR″ or $NR''_2$; and X may be pendent on or terminate the hydrocarbon chain;

wherein the improvement comprises the addition of a non-stoichiometric amount of protease enzyme, said protease acting to catalyze the production of peracid enzymatically.

2. The method of claim 1 wherein said substrate is selected from the group consisting of methyl acetate; (2-hexyloxyethoxy) acetic acid, (2-hydroxypropyl) ester; methylmethoxyacetate; hydroxypropyloctanoate; methyloctanoate; and ethyloctanoate.

3. An improved activated oxidant system for in situ generation of peracid by proteolytic perhydrolysis comprising an aqueous medium containing a combination of an effective amount of a source of hydrogen peroxide and a substrate having the structure:

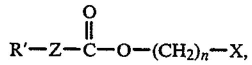

wherein $R'=C_{1-10}$ alkyl; Z=0, $(CH_2CH_2O)_m$—,

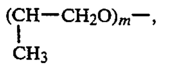

NH, $SO_2$ or NR'' (wherein m=0-10 and R''=phenyl or $C_{1-4}$ alkyl); n=0-10; X=H, OH, —OR'' or $NR''_2$; and X may be pendent on or terminate the hydrocarbon chain;

wherein the improvement comprises the addition of a non-stoichiometric amount of protease enzyme, said protease acting to catalyze the production of peracid enzymatically.

4. The activated oxidant system of claim 3 wherein said substrate is selected from the group consisting of methyl acetate; (2-hexyloxyethoxy) acetic acid, (2-hydroxypropyl) ester; methylmethoxyacetate; hydroxypropyloctanoate; methyloctanoate; and ethyloctanoate.

* * * * *